(12) United States Patent
Ryu et al.

(10) Patent No.: US 12,044,656 B2
(45) Date of Patent: Jul. 23, 2024

(54) METHOD FOR TESTING SECONDARY BATTERY AND METHOD FOR MANUFACTURING SECONDARY BATTERY INCLUDING THE SAME

(71) Applicant: InnoRay Co. Ltd., Daejeon (KR)

(72) Inventors: Chae Myong Ryu, Seoul (KR); Kil Suk Kim, Incheon (KR); Se Woong Jung, Gyeonggi-do (KR)

(73) Assignee: INNORAY CO. LTD., Daejeon (KR)

( * ) Notice: Subject to any disclaimer, the term of this patent is extended or adjusted under 35 U.S.C. 154(b) by 218 days.

(21) Appl. No.: 17/643,026

(22) Filed: Dec. 7, 2021

(65) Prior Publication Data

US 2022/0205957 A1 Jun. 30, 2022

(30) Foreign Application Priority Data

Dec. 24, 2020 (KR) .................. 10-2020-0183507

(51) Int. Cl.
| | | |
|---|---|---|
| *G01N 29/24* | (2006.01) | |
| *G01N 29/04* | (2006.01) | |
| *G01N 29/44* | (2006.01) | |
| *H01M 10/04* | (2006.01) | |
| *H01M 10/42* | (2006.01) | |

(52) U.S. Cl.
CPC .......... *G01N 29/2418* (2013.01); *G01N 29/04* (2013.01); *G01N 29/44* (2013.01); *H01M 10/0422* (2013.01); *H01M 10/4285* (2013.01); *G01N 2291/023* (2013.01); *G01N 2291/0289* (2013.01)

(58) Field of Classification Search
CPC .... G01N 29/2418; G01N 29/04; G01N 29/44; G01N 29/4427; G01N 29/14; G01N 29/27; G01N 29/46; G01N 29/043; G01N 29/4445; G01N 2291/023; G01N 2291/0289; G01N 2291/102; G01N 2291/2697; H01M 10/0422; H01M 10/4285; H01M 50/109; H01M 50/169; Y02P 70/50; Y02E 60/10; B23K 31/125
See application file for complete search history.

(56) References Cited

U.S. PATENT DOCUMENTS

| | | | |
|---|---|---|---|
| 2018/0241026 A1* | 8/2018 | Shibutani | H01M 10/0587 |
| 2019/0103639 A1* | 4/2019 | Guglielmo | H01M 50/249 |
| 2019/0170703 A1 | 6/2019 | Koo et al. | |

FOREIGN PATENT DOCUMENTS

| | | |
|---|---|---|
| JP | H09320638 A | 12/1997 |
| JP | 2020004646 A | 1/2020 |
| KR | 100778242 B1 | 11/2007 |
| KR | 20090036285 A | 4/2009 |
| KR | 20180091480 A | 8/2018 |
| KR | 20200064737 A | 6/2020 |

OTHER PUBLICATIONS

Liu, H., et al., "Photoacoustic Imaging of Lithium Metal Batteries," 1-16 (2019).

* cited by examiner

*Primary Examiner* — Suman K Nath
(74) *Attorney, Agent, or Firm* — HoustonHogle LLP

(57) ABSTRACT

Provided are a method for testing a secondary battery, which include applying laser to the secondary battery after a manufacturing process is completed to generate an ultrasonic signal, detecting the ultrasonic signal, converting the detected ultrasonic signal to generate a digital signal, and processing and analyzing the digital signal, and a method for manufacturing the secondary battery.

13 Claims, 8 Drawing Sheets

METHOD FOR TESTING SECONDARY BATTERY AND METHOD FOR MANUFACTURING SECONDARY BATTERY INCLUDING THE SAME

CROSS-REFERENCE TO RELATED APPLICATIONS

This U.S. non-provisional patent application claims priority under 35 U.S.C. § 119 of Korean Patent Application No. 10-2020-0183507, filed on Dec. 24, 2020, the entire contents of which are hereby incorporated by reference.

BACKGROUND

The present disclosure herein relates to a method for testing a secondary battery and a method for manufacturing a secondary battery including the same, and more particularly, to a test method for detecting defects in a process through ultrasonic waves generated during a process of manufacturing a secondary battery or ultrasonic waves generated by laser applied for inspection after the secondary battery is completely manufactured, and a method for manufacturing a secondary battery including the same.

When laser is irradiated onto a material, light energy is converted into thermal energy, and thus, vibration, i.e., ultrasonic waves are generated due to an instantaneous change in volume. Since the ultrasonic waves induced by the laser reflect properties of the material, the properties of the material may be examined by analyzing the properties of the material.

On the other hand, the development and use of secondary batteries have recently been increasing due to the advantages of being rechargeable and capable of being small and large-capacity. A secondary battery is formed by accommodating an electrode assembly including a positive electrode, a negative electrode, and a separator in a pouch and then injecting an electrolyte therein. The positive electrode and the negative electrode constituting the electrode assembly of the secondary battery are formed by applying a positive electrode material and a negative electrode material on an electrode sheet. The secondary battery is required to have various performance according to a device applied thereto, and thus, it is necessary to develop a secondary battery using various positive and negative electrode materials. In addition, studies on a method of detecting process defects occurring during a process of manufacturing various secondary batteries are being conducted.

However, the currently used inspection technologies, such as X-ray inspection, destructive inspection, or visual inspection, have a limitation in that defects inside the material are not inspected at a high speed, and thus, rapid and accurate non-destructive inspection technologies are required.

SUMMARY

The present disclosure provides a method for quickly and easily detecting internal and external defects occurring during a process of manufacturing a secondary battery, which are not detected through the existing methods.

Technical objects to be solved by the present invention are not limited to the aforementioned technical objects and unmentioned technical objects will be clearly understood by those skilled in the art from the specification and the appended claims.

An embodiment of the inventive concept provides a method for testing a secondary battery, the method including: applying laser to the secondary battery after a manufacturing process is completed to generate an ultrasonic signal; detecting the ultrasonic signal; converting the detected ultrasonic signal to generate a digital signal; and processing and analyzing the digital signal.

In an embodiment, the processing and analyzing of the digital signal may be performed by learning a difference depending on whether defects occur in the secondary battery or by directly detecting a specific signal generated when the defects occur.

In an embodiment, the applying of the laser to generate the ultrasonic signal may include: emitting the laser from a laser source; and applying the laser emitted from the laser source to a portion of the secondary battery through a transmission part and a focusing part.

In an embodiment, the transmission part may be configured to adjust a position, to which the laser is applied, by controlling a path of the laser, and the focusing part may be configured to focus the laser to control a size of a focal point.

In an embodiment, the secondary battery may include: an electrode assembly including a positive electrode, a negative electrode, and a separator between the positive electrode and the negative electrode; a can surrounding the electrode assembly; and a cap covering at least one surface of top and bottom surfaces of the can, wherein each of the positive electrode and the negative electrode has a jelly-roll type, wherein the laser may be applied to welding regions defined as a position at which a welding process is performed, and the welding process may be performed to couple the electrode assembly to the can, the electrode assembly to the cap, and the can to the cap.

In an embodiment, the can may have a cylindrical shape having a height greater than a diameter of the top surface thereof, and the laser is applied to at least one of the welding regions.

In an embodiment, the laser may generate the ultrasonic signal at an edge of the cap.

In an embodiment, the can may have a coin shape having a diameter of the top surface, which is greater than a height thereof, and the laser may be applied to a sidewall of the can.

In an embodiment, the laser may generate the ultrasonic signal to the top surface of the cap.

In an embodiment, rotating the secondary battery in one direction at a predetermined time interval and the applying of the laser to generate the ultrasonic signal may be repeatedly performed.

In an embodiment, the secondary battery for which the manufacturing process is completed may be provided in plurality, and the secondary batteries may move in one direction along a rail and are sequentially tested by a fixed test device.

In an embodiment, the test device may include a mount, a laser head fixed by the mount, a fiber laser connected to the laser head, and an ultrasonic sensor disposed at one side of the laser head, and the secondary batteries may move into a space between the laser head and the rail.

In an embodiment, the ultrasonic signal may be temporally and spatially synchronized with the applied laser.

In an embodiment of the inventive concept, a method for testing a secondary battery includes: detecting an ultrasonic signal generated during a process of manufacturing the secondary battery; converting the detected ultrasonic signal to generate a digital signal; and processing and analyzing the digital signal, wherein the ultrasonic signal is generated by a welding process during the process of manufacturing the secondary battery.

In an embodiment, the welding process may be at least one of a laser welding process, an ultrasonic welding process, and a resistance welding process.

In an embodiment, the processing and analyzing of the digital signal may be performed by learning a difference depending on whether defects occur in the secondary battery or by directly detecting a specific signal generated when the defects occur.

In an embodiment of the inventive concept, a method for manufacturing a secondary battery includes: coupling different components constituting the secondary battery to each other through a welding process; applying laser to welding regions, on which the welding process is performed, to generate an ultrasonic signal; and processing and analyzing the ultrasonic signal to test the secondary battery whether defects occur in the secondary battery.

In an embodiment, the secondary battery may include: an electrode assembly including a positive electrode, a negative electrode, and a separator between the positive electrode and the negative electrode; a can surrounding the electrode assembly; and a cap covering at least one surface of top and bottom surfaces of the can, wherein each of the positive electrode and the negative electrode has a jelly-roll type, and wherein the welding process may be performed to couple the electrode assembly to the can, the electrode assembly to the cap, and the can to the cap.

In an embodiment, rotating the secondary battery in one direction at a predetermined time interval and the applying of the laser to generate the ultrasonic signal may be repeatedly performed.

In an embodiment, the processing and analyzing of the ultrasonic signal to test the secondary battery whether the defects occur in the secondary battery may be performed by learning a difference depending on whether the defects occur in the secondary battery or by directly detecting a specific signal generated when the defects occur.

BRIEF DESCRIPTION OF THE FIGURES

The accompanying drawings are included to provide a further understanding of the inventive concept and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
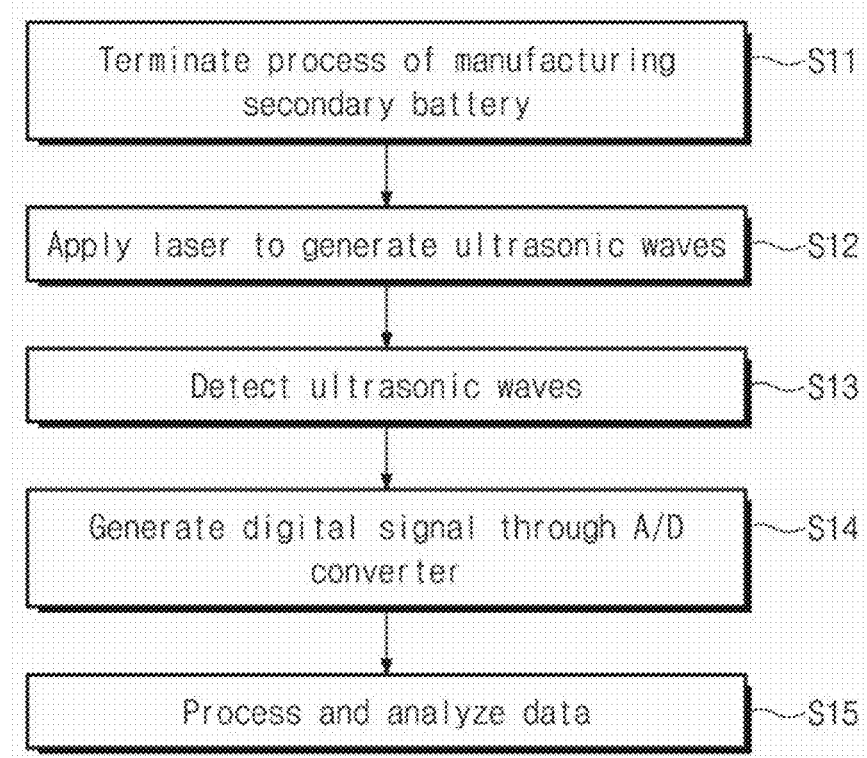
FIGS. 1 and 3 are flowcharts for explaining a method for testing a secondary battery according to embodiments of the inventive concept.

Embodiments of the inventive concept will be described with reference to the accompanying drawings so as to sufficiently understand constitutions and effects of the inventive concept.

The present invention is not limited to the embodiments disclosed below, but should be implemented in various forms, and various modifications and changes may be made. Rather, these embodiments are provided so that this disclosure will be thorough and complete, and will fully convey the scope of the present invention to those skilled in the art. Further, the present invention is only defined by scopes of claims. In the accompanying drawings, the ratio of each component may be exaggerated or reduced for convenience of description.

In the following description, the technical terms are used only for explaining a specific exemplary embodiment while not limiting the present invention. Unless terms used in embodiments of the present invention are differently defined, the terms may be construed as meanings that are commonly known to a person skilled in the art.

In this specification, the terms of a singular form may include plural forms unless specifically mentioned. The meaning of 'comprises' and/or 'comprising' specifies a component, a step, an operation and/or an element does not exclude other components, steps, operations and/or elements.

It will be understood that although the terms first and second are used herein to describe various regions, directions, shapes, and the like, these regions, directions, and shapes should not be limited by these terms. These terms are used only to discriminate one region, direction, or shape from another region, direction, or shape. Therefore, a portion referred to as a first portion in one embodiment can be referred to as a second portion in another embodiment. An embodiment described and exemplified herein includes a complementary embodiment thereof. Like reference numerals refer to like elements throughout.

Hereinafter, a method for testing a secondary battery and a method for manufacturing a secondary battery including the same according to embodiments of the inventive concept will be described in detail with reference to the drawings.

FIG. 1 is a flowchart for explaining a method for testing a secondary battery according to embodiments of the inventive concept. In more detail, FIG. 1 is a flowchart for explaining a test method for detecting process defects through ultrasonic waves generated by laser applied after a process of manufacturing the secondary battery is completed.

Referring to FIG. 1, a method for testing a secondary battery according to an embodiment of the inventive concept includes a process (S11) of terminating a secondary battery manufacturing process, a process (S12) of applying laser to the secondary battery after the manufacturing process is completed to generate ultrasonic waves, a process (S13) of detecting the ultrasonic waves generated by applying the laser, a process (S14) of converting an ultrasonic signal detected through an A/D converter to generate a digital signal, and a process (S15) of processing and analyzing data of the digital signal. The process (S15) of processing and analyzing the data of the digital signal may be performed by learning a difference depending on whether defects occur in the secondary battery or by directly detecting a specific signal generated when the defects occur.

In more detail, the laser may be applied to a specific position determined according to a shape of the secondary battery and a welding portion. A position, at which the laser is applied, and a position, at which the ultrasonic waves are generated, according to the shape of the secondary battery and the welding portion will be described in detail below with reference to FIGS. 4 and 5.

According to the inventive concept, qualities inside and outside the secondary battery may be inspected by processing and analyzing the ultrasonic signal generated by the applied laser. The ultrasonic signal generated by the applied laser may be an analog signal. The ultrasonic signal may be temporally and spatially synchronized with the applied laser. The ultrasonic signal may be converted into a digital signal through an A/D converter. The converted digital signal may be processed through computer software and may be processed and analyzed through deep learning. Accordingly, in the method for testing the secondary battery according to the inventive concept, total inspection of a plurality of secondary batteries may be quickly and easily performed to reduce costs due to product defects.

The method for manufacturing the secondary battery according to the inventive concept may include a process of coupling a can and a cap, which will be described later with reference to FIGS. 4 and 5, to each other through a welding process, and the process of applying the laser to welding regions, on which the welding process is performed, to generate the ultrasonic signal and the process of processing and analyzing the ultrasonic signal to test the secondary battery whether the defects of the secondary battery occur, which are described with reference to FIG. 1. The process of processing and analyzing the ultrasonic signal to test the secondary battery whether the defects occur in the secondary battery may be performed by learning a difference depending on whether the defects occur in the secondary battery or by directly detecting a specific signal generated when the defects occur.

Figure 2:
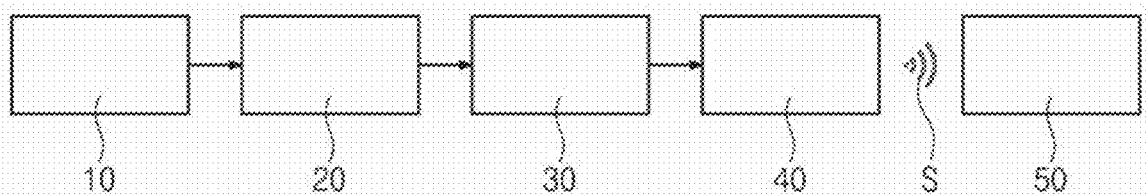
FIG. 2 is a conceptual view for explaining the method for testing the secondary battery according to embodiments of the inventive concept.

FIG. 2 is a conceptual view for explaining the process of applying the laser to detect the ultrasonic signal in the method for testing the secondary battery according to embodiments of the inventive concept, in detail.

Referring to FIG. 2, laser may be emitted from a laser source 10. The laser emitted from the laser source 10 may be applied to a target 40 through a transmission part 20 and a focusing part 30. The transmission part 20 may adjust the position, to which the laser is applied, by controlling a path of the laser. The focusing part 30 may focus the laser to control a size of a focal point. The transmission part 20 and the focusing part 30 may include various optical systems depending on the purpose. The target 40 may be a portion of the secondary battery. For example, the target 40 may be one of welding portions of the secondary battery. An ultrasonic detection part 50 may detect an ultrasonic signal S generated from the target 40 by the applied laser. The ultrasonic detection part 50 may include an ultrasonic detection sensor. The ultrasonic detection part 50 may transmit the detected ultrasonic signal S to the A/D converter.

Figure 3:
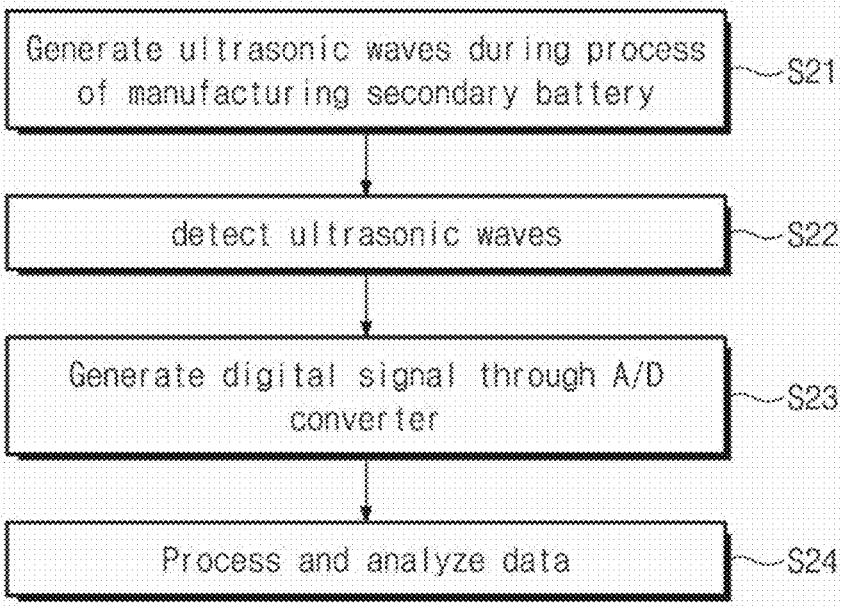

FIG. 3 is a flowchart for explaining the method for testing the secondary battery according to embodiments of the inventive concept. In more detail, FIG. 3 is a flowchart for explaining a test method for detecting the process defects through the ultrasonic waves generated during the process of manufacturing the secondary battery.

Referring to FIG. 3, the method for testing the secondary battery according to an embodiment of the inventive concept includes a process (S21) of generating the ultrasonic waves during the process of manufacturing the secondary battery, a process (S22) of detecting the ultrasonic waves during the process of manufacturing the secondary battery, a process (S23) of converting the ultrasonic signal detected through the A/D converter to generate the digital signal, and a process (S24) of processing and analyzing the data of the digital signal.

In more detail, the ultrasonic waves may be generated by at least one of a laser welding process, an ultrasonic welding process, a resistance welding process, and the like during the process of manufacturing the secondary battery. According to the inventive concept, the process of manufacturing the secondary battery may be managed in real time by detecting and analyzing the ultrasonic waves generated from various causes during the process of manufacturing the secondary battery. The process of detecting, processing, and analyzing the ultrasonic waves may be substantially the same as that described with reference to FIGS. 1 and 2.

Figure 4:
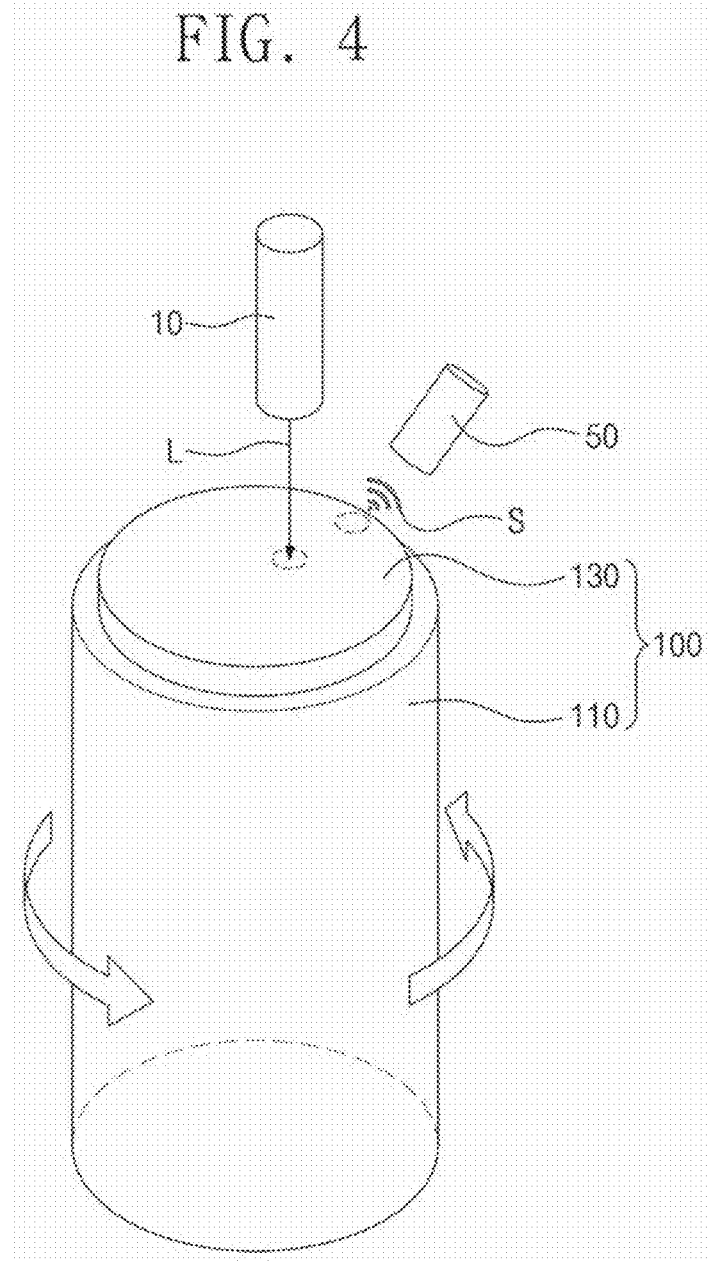
FIGS. 4 and 5 are perspective views for explaining the method for testing the secondary battery according to embodiments of the inventive concept.

FIG. 4 is a perspective view for explaining the method for testing the secondary battery according to embodiments of the inventive concept.

Referring to FIG. 4, a secondary battery 100 may include an electrode assembly, a can 110, and a cap 130. For example, the can 110 may have a cylindrical shape having a height greater than a diameter of a top surface thereof. For example, the cap 130 may have a coin shape having a diameter of a top surface, which is greater than a height thereof. For example, the diameter of the top surface of the can 110 may be greater than the diameter of the top surface of the cap 130.

The cap 130 may cover at least one of top and bottom surface of the can 110. When the can 110 has a pipe shape of which top and bottom surfaces are opened, the cap 130 may cover both the top and bottom surfaces of the can 110. When the can 110 has a pipe shape of which a top surface is opened, and a bottom surface is closed, the cap 130 may cover the top surface of the can 110.

Although not shown, the can 110 may surround an electrode assembly including a positive electrode, a negative electrode, and a separator between the positive electrode and the negative electrode. In other words, the electrode assembly including the positive electrode, the negative electrode, and the separator may be provided in an inner space surrounded by the can 110. In addition, an electrolyte may be filled into a space between the positive electrode, the negative electrode, and the separator and the can 110. Each of the positive electrode and the negative electrode may have a jelly-roll type.

The cap 130 may include welding regions on the top or bottom surface thereof. For example, the welding regions may be regions recessed by a predetermined depth from the top surface of the cap 130 and may have rotational symmetry. Weld regions may be opened at an edge of the cap 130. However, this is merely an example, and positions and shapes of the welding regions are not limited thereto. A welding process may be performed on the welding regions to couple the electrode assembly to the can 110, the electrode assembly to the cap 130, and the can 110 to the cap 130.

The laser L emitted from the laser source 10 may be applied to any one of the above-described welding regions. For example, the laser L may be applied to a position that is close to a center of the cap 130 at any one of the welding regions. Although not shown, the optical systems corresponding to the transmission part 20 and the focusing part 30 described with reference to FIG. 2 may be provided between the laser source 10 and the welding regions.

The laser L applied to any one of the welding regions may generate the ultrasonic signal S at the edge of the cap 130.

The ultrasonic detection part 50 disposed adjacent to the cap 130 may detect the ultrasonic signal S.

The secondary battery 100 including the electrode assembly, the can 110, and the cap 130 may rotate in one direction while the positions of the laser source 10 and the ultrasonic detection part 50 are fixed. The rotation of the secondary battery 100 at a predetermined time interval and the generation of the ultrasonic signal S by applying the laser L may be repeatedly performed. For example, the secondary battery 100 may rotate by about 90 degrees at a predetermined time interval, and accordingly, the laser L may be applied to each of the welding regions, and thus, four ultrasonic signals S may be obtained. However, this is merely an example, and the number of obtainable ultrasonic signals S may vary depending on the positions of the welding regions, the number of welding regions, and a rotation angle of the secondary battery 100.

Figure 5:
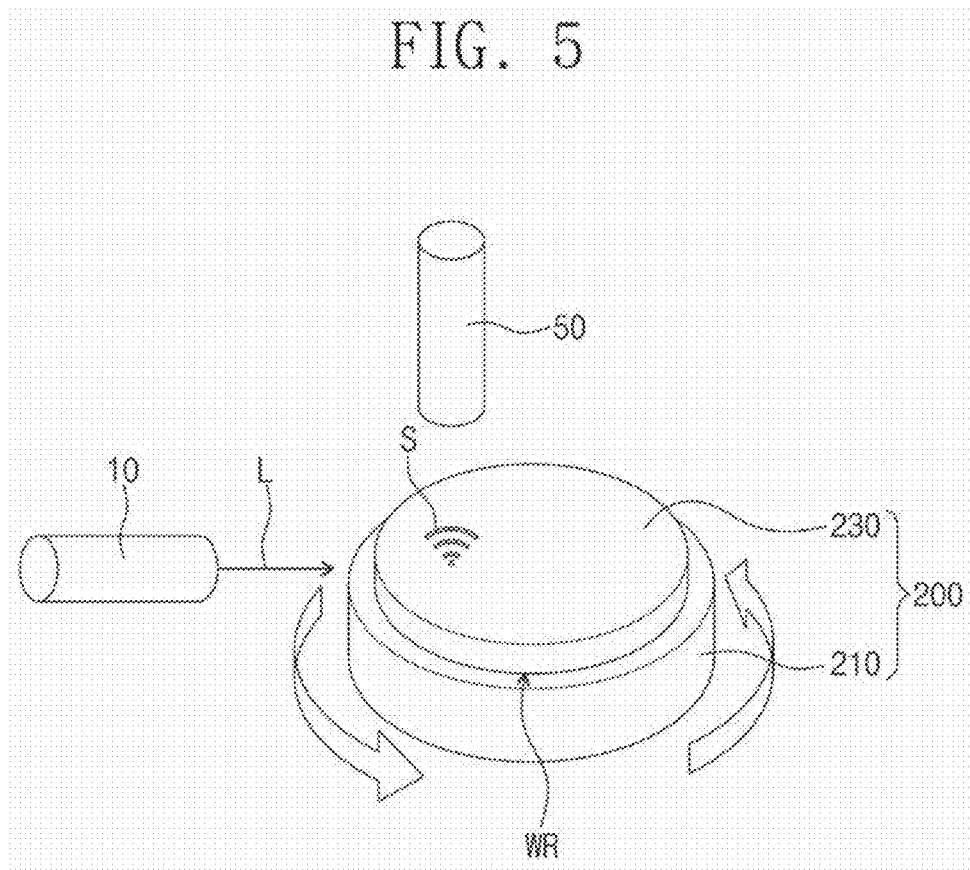

FIG. 5 is a perspective view for explaining a method for testing a secondary battery according to embodiments of the inventive concept. For convenience of description, descriptions of items substantially the same as those described with reference to FIG. 4 will be omitted.

Referring to FIG. 5, a secondary battery 200 may include an electrode assembly, a can 210, and a cap 230. Each of the can 210 and the cap 230 may have a coin shape having a diameter of a top surface, which is greater than a height thereof. The diameter of the top surface of the can 210 may be greater than the diameter of the top surface of the cap 230.

The cap 230 may cover at least one of top and bottom surface of the can 210. The cap 230 may include a welding region WR at an edge of the bottom surface thereof. A welding process may be performed on the welding regions WR to couple the electrode assembly to the can 110, the electrode assembly to the cap 130, and the can 110 to the cap 130.

Laser L emitted from the laser source 10 may be applied to a sidewall of the can 210 adjacent to the welding regions WR. Although not shown, the optical systems corresponding to the transmission part 20 and the focusing part 30 described with reference to FIG. 2 may be provided between the laser source 10 and the sidewall of the can 210.

The laser L applied to the sidewall of the can 210 may generate an ultrasonic signal S to the top surface of the cap 230. The ultrasonic detection part 50 disposed adjacent to the top surface of the cap 230 may detect the ultrasonic signal S.

The secondary battery 200 including the electrode assembly, the can 210, and the cap 230 may rotate in one direction while the positions of the laser source 10 and the ultrasonic detection part 50 are fixed. For example, the secondary battery 200 may rotate by about 10 degrees at a predetermined time interval, and thus 36 ultrasonic signals S may be obtained. However, this is merely an example, and the number of obtainable ultrasonic signals S may vary depending on a rotation angle of the secondary battery 200.

Figure 6:
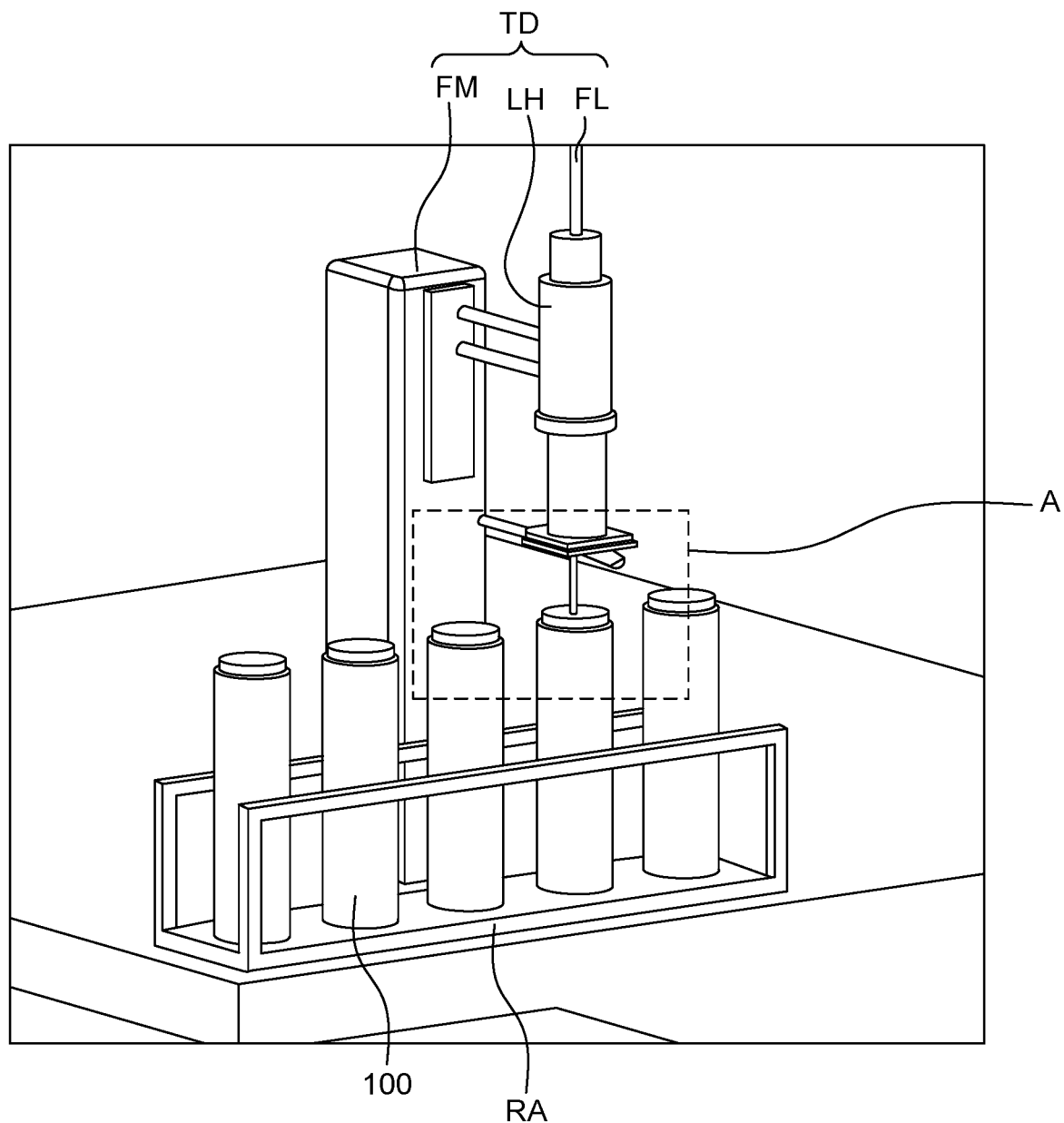
FIG. 6 is a perspective view for explaining the method for testing the secondary battery according to embodiments of the inventive concept.
Figure 7:
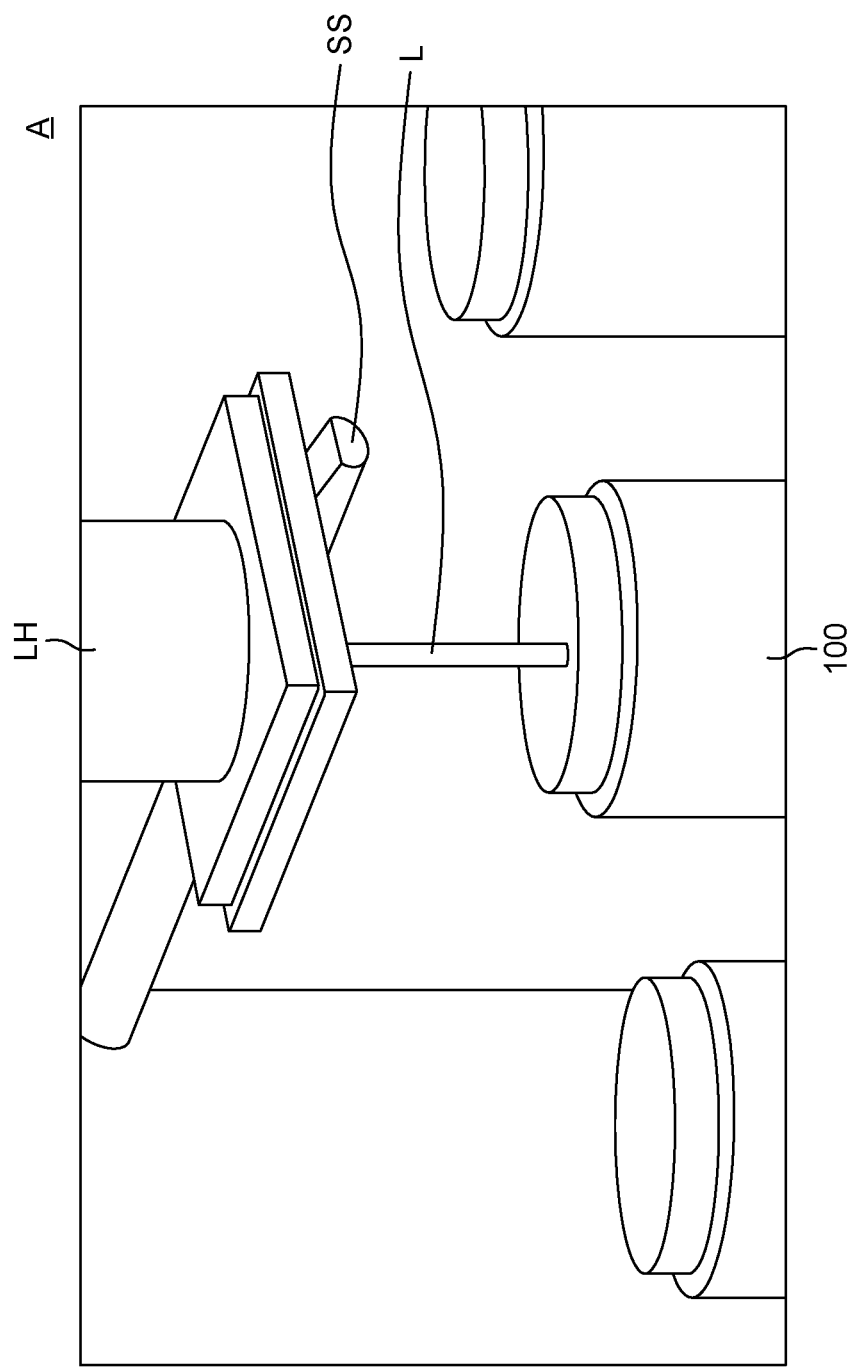
FIG. 7 is an enlarged view for explaining the method for testing the secondary battery according to embodiments of the inventive concept and corresponds to a portion A of FIG. 6.

FIG. 6 is a perspective view for explaining the method for testing the secondary battery according to embodiments of the inventive concept. FIG. 7 is an enlarged view for explaining the method for testing the secondary battery according to embodiments of the inventive concept and corresponds to a portion A of FIG. 6.

Referring to FIGS. 6 and 7, a plurality of secondary batteries 100 for which the manufacturing process is completed may move along a rail RA. The plurality of secondary batteries 100 moving along the rail RA may be sequentially tested by a fixed test device TD. The test device TD may include a mount FM, a laser head LH fixed by the mount FM, a fiber laser FL connected to the laser head LH, and an ultrasonic sensor SS disposed at one side of the laser head LH. The laser head LH may vertically overlap the rail RA on which the plurality of secondary batteries 100 are disposed and be spaced apart from the rail RA. The plurality of secondary batteries 100 may move into a space between the laser head LH and the rail RA.

The laser emitted through the fiber laser FL may be applied to a top surface of any one of the secondary batteries 100 through the laser head LH. For example, the laser may be applied to one of the welding regions described with reference to FIG. 4, and an ultrasonic signal generated by applying the laser may be detected through an ultrasonic sensor SS disposed adjacent to the welding regions. The position of the ultrasonic sensor SS may vary according to positions and shapes of the welding regions.

Figure 8:
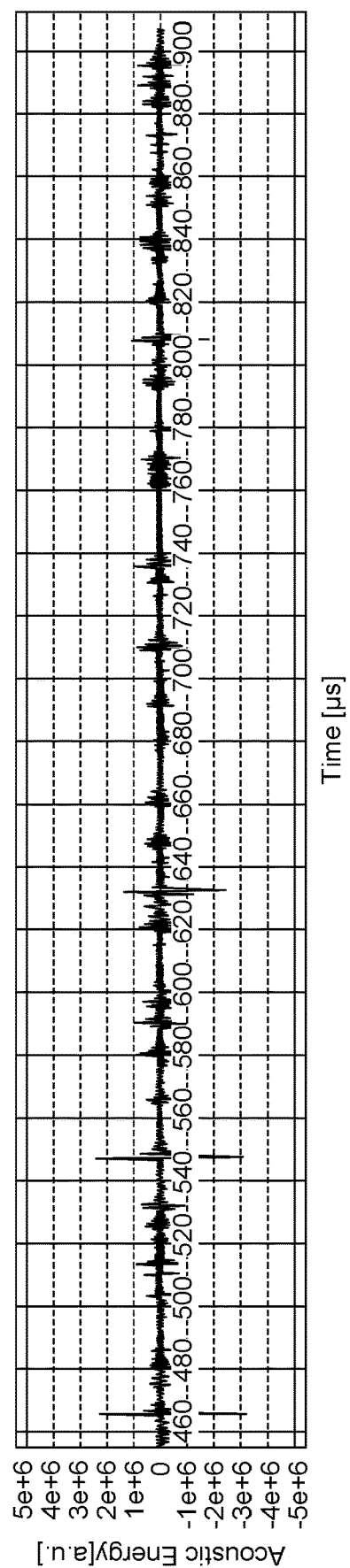
FIGS. 8 and 9 are views for explaining the method for testing the secondary battery according to embodiments of the inventive concept and are graphs related to data processing and analysis.
Figure 9:
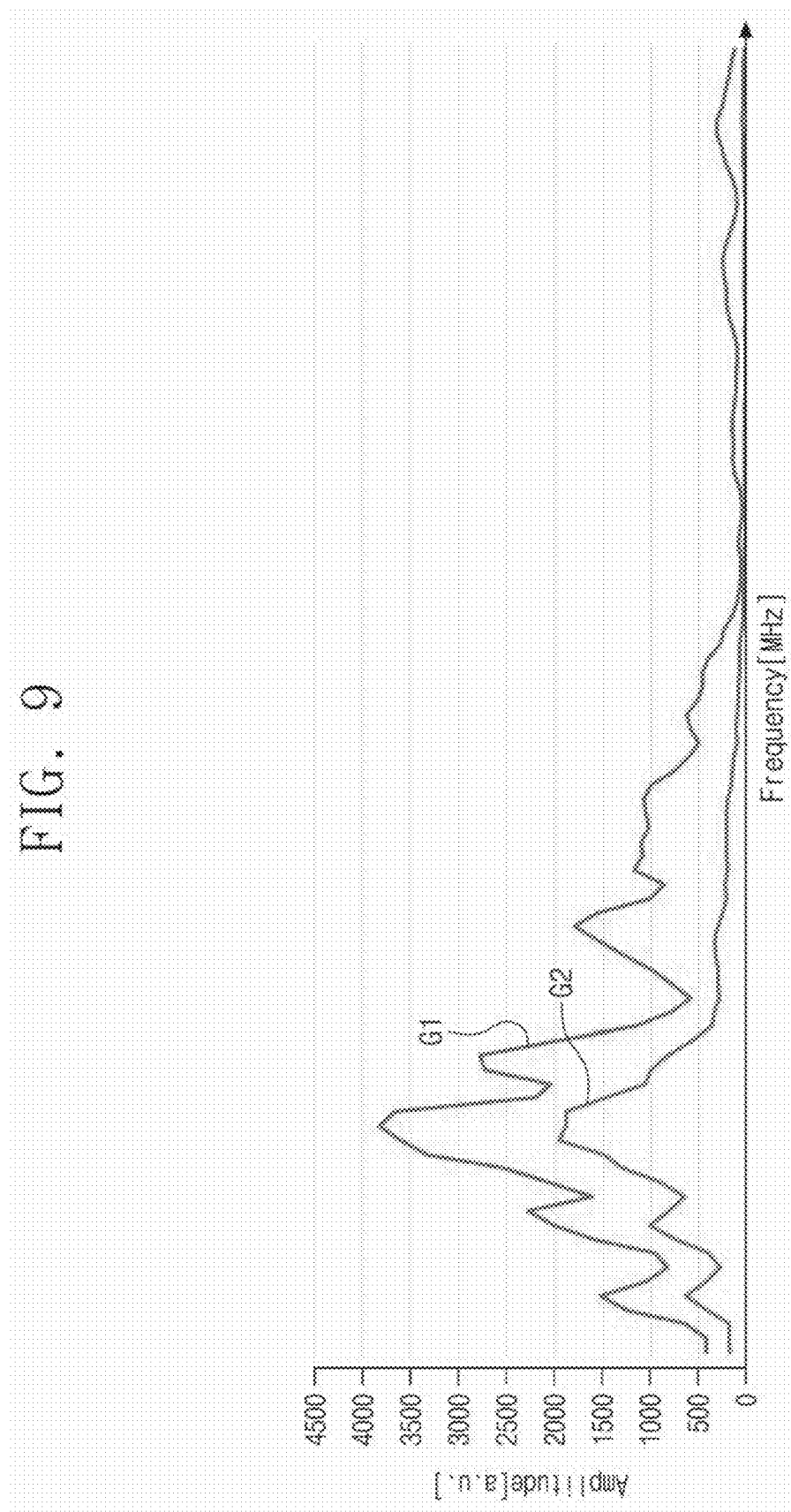

FIGS. 8 and 9 are views for explaining the method for testing the secondary battery according to embodiments of the inventive concept and are graphs related to data processing and analysis. In more detail, FIG. 8 is a view for explaining acoustic energy with respect to a time of the ultrasonic signals detected by the ultrasonic sensor, and FIG. 9 is a view for explaining an amplitude with respect to a frequency of each of the ultrasonic signals that have been processed and analyzed. In FIG. 8, a horizontal axis represents the time, a unit is μs, and a vertical axis represents a relative magnitude of the acoustic energy. In FIG. 9, a horizontal axis represents the frequency, a unit is MHz, and a vertical axis represents a relative magnitude of the amplitude.

As illustrated in FIG. 8, raw data of the ultrasonic signals may be converted into a digital signal through an A/D converter, and the converted digital signal may be processed through computer software. The processed signal may be displayed as a graph as illustrated in FIG. 9.

For example, a first graph G1 represents a signal generated from a secondary battery having no defect (a "normal signal"), and a second graph G2 represents a signal generated from a secondary battery having defects. According to the inventive concept, whether defects occur in the secondary battery may be effectively and quickly determined by learning a signal representing a secondary battery having no defect (G1), i.e., a normal signal, and determining a between the normal signal and a signal generated by a secondary battery under test (for example, G2). In addition, whether the secondary battery under test is defective may be determined by directly detecting a specific signal generated when the defects occur.

According to the method for testing the secondary battery of the present invention, the ultrasonic signal generated during the process of manufacturing the secondary battery or the ultrasonic signal generated by the laser applied for the inspection after the secondary battery is completely manufactured may be processed and analyzed to inspect the external and internal qualities of the secondary battery.

According to the method for testing the secondary battery of the present invention, the total inspection of the plurality of secondary batteries may be quickly and easily performed to reduce the cost due to the product defects.

Although the embodiment of the inventive concept is described with reference to the accompanying drawings, those with ordinary skill in the technical field of the inventive concept pertains will be understood that the present disclosure can be carried out in other specific forms without changing the technical idea or essential features. Therefore, the above-disclosed embodiments are to be considered illustrative and not restrictive.

What is claimed is:

1. A method for testing a secondary battery, the method comprising:
    applying laser to the secondary battery after a manufacturing process is completed to generate an ultrasonic signal;
    detecting the ultrasonic signal;
    converting the detected ultrasonic signal to generate a digital signal; and
    processing and analyzing the digital signal to determine defects in the secondary battery;
    wherein the secondary battery comprises:
        an electrode assembly;
        a can surrounding the electrode assembly; and
        a cap covering a top surface of the can, wherein the top surface of the can and a bottom surface of the cap are coupled by a welding process,
    wherein the secondary battery for which the manufacturing process is completed is provided in plurality,
    wherein the secondary batteries move in one direction along a rail and are sequentially tested by a fixed test device,
    wherein the test device comprises a mount, a laser head fixed by the mount, a fiber laser connected to the laser head, and an ultrasonic sensor disposed at one side of the laser head,
    wherein the secondary batteries move into a space between the laser head and the rail,
    wherein the fiber laser applies the laser to a top surface of the cap to generate an ultrasonic signal at an edge of the cap, and
    wherein the ultrasonic sensor is disposed adjacent to the edge of the cap to detect the ultrasonic signal generated at the edge of the cap.

2. The method of claim 1, wherein the processing and analyzing of the digital signal determines defects in the secondary battery by determining a difference between the digital signal and a normal signal or by directly detecting a specific signal generated when the defects occur.

3. The method of claim 1, wherein the applying of the laser to generate the ultrasonic signal comprises:
    emitting the laser from a laser source; and
    applying the laser emitted from the laser source to a portion of the secondary battery through a transmission part and a focusing part.

4. The method of claim 3, wherein the transmission part is configured to adjust a position, to which the laser is applied, by controlling a path of the laser, and
    the focusing part is configured to focus the laser to control a size of a focal point.

5. The method of claim 1,
    wherein the secondary battery is a jelly-roll type, and
    wherein applying the laser to a top surface of the cap comprises focusing the laser on welding regions defined as a position at which the welding process is performed.

6. The method of claim 5, wherein the can has a cylindrical shape having a height greater than a diameter of the top surface thereof, and
    the laser is applied to at least one of the welding regions.

7. The method of claim 6, wherein the laser generates the ultrasonic signal at an edge of the cap.

8. The method of claim 5, wherein the can has a coin shape having a diameter of the top surface, which is greater than a height thereof, and
    the laser is applied to a sidewall of the can.

9. The method of claim 8, wherein the laser generates the ultrasonic signal to the top surface of the cap.

10. The method of claim 1, wherein rotating the secondary battery in one direction at a predetermined time interval and the applying of the laser to generate the ultrasonic signal are repeatedly performed.

11. The method of claim 1, wherein the secondary battery for which the manufacturing process is completed is provided in plurality, and
    the secondary batteries move in one direction along a rail and are sequentially tested by a fixed test device.

12. The method of claim 11, wherein the test device comprises a mount, a laser head fixed by the mount, a fiber laser connected to the laser head, and an ultrasonic sensor disposed at one side of the laser head, and
    the secondary batteries move into a space between the laser head and the rail.

13. The method of claim 1, wherein the ultrasonic signal is temporally and spatially synchronized with the applied laser.

* * * * *